April 2, 1968 K. H. GREIFENHAGEN ETAL 3,375,964
GUIDE DEVICE IN AN APPARATUS FOR MAGNETIC RECORDING AND REPRODUCING OF HIGH-FREQUENCY SIGNALS
Filed Aug. 23, 1965
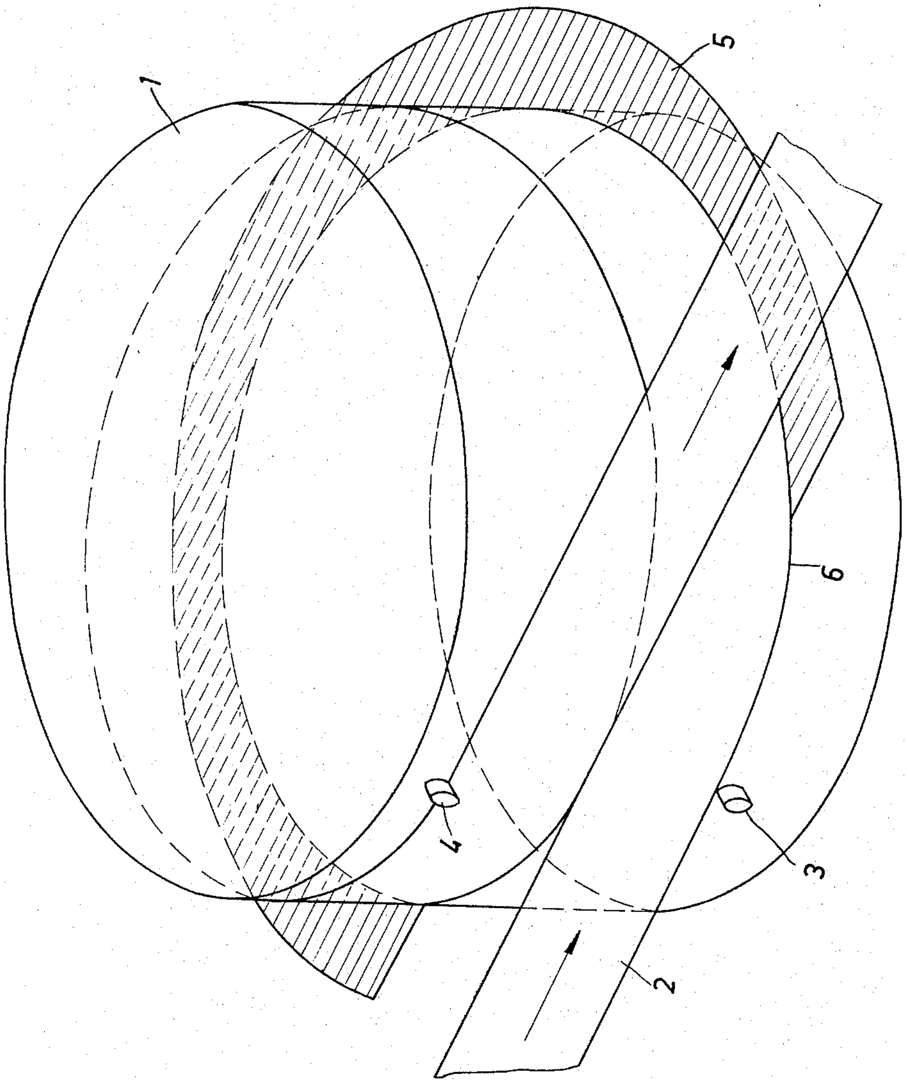
Inventors:
Karl Heinz Greifenhagen
Dieter Döhnlein

United States Patent Office 3,375,964

Patented Apr. 2, 1968

3,375,964

GUIDE DEVICE IN AN APPARATUS FOR MAGNETIC RECORDING AND REPRODUCING OF HIGH-FREQUENCY SIGNALS

Karl Heinz Greifenhagen, Gottfried-Neukamstrasse 6, and Dieter Söhnlein, Gerhard-Hauptmann-Strasse 2, both of Kronach, Upper Franconia, Germany

Filed Aug. 23, 1965, Ser. No. 483,903
Claims priority, application Germany, Aug. 27, 1964, L 37,832
2 Claims. (Cl. 226—197)

ABSTRACT OF THE DISCLOSURE

A magnetic recording and reproducing apparatus with a tape guide drum provided with known guide means which prevent the tape from axial displacement. An additional guide surface is positioned normal to the drum surface and below the guide means.

A known apparatus for magnetic recording and reproducing of television signals comprising two cylinders disposed above each other approximately vertically and coaxially, between which a wheel body or hub rotates bearing on its periphery magnetic heads. The two cylinders form a guide drum, over which a magnetic tape is helically looped once.

To enable a recorded composite television signal to be properly reproduced at all times, provision must be made for the tape to loop round the drum and the head wheelbody in exactly the same relative positions as in the recording process. The tape must therefore in no case slip out of position parallel to the vertical guide drum axis during recording and playback. In addition the tape must not slip down when the apparatus is at rest or when tension on the tape falls below a critical value.

To avoid these disadvantages provision is therefore made in the known manner by having each cylinder surrounded by a row of guide pins disposed helically in such a way that the distance between the two rows equals the width of the tape. Once a tape is then laid in the guide way, it is forced to run always in the same position over the guide drum when the tape motion is switched on.

It has, however, appeared that laying the tape in the tape guide-way of the guide drum involves difficulties inasmuch as the tape must always be held taut, e.g. by hand-turning the feeding and take-up reels in opposite directions. Otherwise it must be expected that the tape will slip out of the guide way or will drop. The aim of the invention is therefore to simplify and improve the laying of the tape in the guide means of the drum.

In accordance with the invention the problem is solved by providing an additional guide surface which encircles the drum below the known tape guide means and which is positioned normal to the drum surface.

On being laid in the tape therefore lies loosely on the guide blade and when the motion is switched on is automatically raised to and/or into the tape guide means of the guide drum and held with the requisite tape tension in the guide means. When the motion is stopped and tape tension ceases the tape can in fact slip out of the normal tape guide means, but it is at once caught by the guide blade.

The invention is explained with the help of an embodiment shown in perspective in the accompanying drawing.

In the drawing 1 indicates a vertically disposed cylindrical guide drum of a magnetic recording and reproducing apparatus for high frequency signals. Over the drum runs helically in approximately one loop a magnetic tape 2, which in a known manner is secured by tape guide pins 3, 4 against axial displacement. To facilitate laying the tape in the tape guide way formed by pins 3 and 4 and any further pins a guide surface or blade 5 is provided, which runs at a slight distance below the lower edge 6 of the tape round the drum and stands normally on the drum surface. The guide blade, some 2 to 4 cm. wide, encircles only some three quarters of the drum circumference, leaving free the areas of tape input—near pin 3—and tape output—near pin 4.

What is claimed is:

1. A guide drum for an apparatus for magnetic recording and reproducing of high-frequency signals, in which a magnetic tape encircles helically in one loop the approximately vertically disposed drum; on the surface of said drum a guide surface or blade of some 2 to 4 cm. width is provided in addition to known tape guide means which serve to secure the tape against axial displacement; said guide surface or blade running helically round the drum at a slight distance from the lower edge of the tape and being positioned normal to the drum surface.

2. A guide drum as claimed in claim 1, wherein the guide blade encircles some three quarters of the circumference of the guide drum, the areas around the input and/or output of the tape to and/or from the guide drum remaining free.

References Cited

UNITED STATES PATENTS

| | | | |
|---|---|---|---|
| 3,123,272 | 3/1964 | Pollaschek | 226—197 |
| 3,125,268 | 3/1964 | Bartholomay | 226—197 X |
| 3,233,809 | 2/1966 | Esterly et al. | 226—197 |
| 1,670,993 | 5/1928 | Smith et al. | 226—199 X |
| 3,261,525 | 7/1966 | De Lange | 226—199 |

ALLEN N. KNOWLES, *Primary Examiner.*

M. HENSON WOOD, Jr., *Examiner.*

J. N. ERLICH, *Assistant Examiner.*